(12) United States Patent
Bhunia et al.

(10) Patent No.: US 11,769,919 B2
(45) Date of Patent: *Sep. 26, 2023

(54) MULTI-FUNCTIONAL HIGH TEMPERATURE STRUCTURE FOR THERMAL MANAGEMENT AND PREVENTION OF EXPLOSION PROPAGATION

(71) Applicant: Teledyne Scientific & Imaging, LLC, Thousand Oaks, CA (US)

(72) Inventors: Avijit Bhunia, Agoura Hills, CA (US); Olivier Sudre, Thousand Oaks, CA (US); Qingjun Cai, Newbury Park, CA (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,963

(22) Filed: Mar. 25, 2014

(65) Prior Publication Data

US 2015/0280295 A1 Oct. 1, 2015

(51) Int. Cl.
| | |
|---|---|
| *H01M 10/6569* | (2014.01) |
| *F28D 15/04* | (2006.01) |
| *H01M 50/213* | (2021.01) |
| *H01M 10/0525* | (2010.01) |

(52) U.S. Cl.
CPC ........ *H01M 10/6569* (2015.04); *F28D 15/04* (2013.01); *F28D 15/046* (2013.01); *H01M 50/213* (2021.01); *H01M 10/0525* (2013.01)

(58) Field of Classification Search
None
See application file for complete search history.

(56) References Cited

U.S. PATENT DOCUMENTS

| | | | |
|---|---|---|---|
| 3,532,158 A | 10/1970 | Hiebert et al. | |
| 3,745,048 A | 7/1973 | Dinkler et al. | |
| 3,815,575 A | 6/1974 | Danis | |
| 3,865,630 A * | 2/1975 | Reimers | F28D 15/02 429/120 |
| 4,007,315 A | 2/1977 | Brinkmann et al. | |
| 4,468,440 A | 8/1984 | Evjen | |
| 5,173,378 A | 12/1992 | Brown et al. | |
| 5,985,483 A | 11/1999 | Verhoog et al. | |
| 6,057,050 A | 5/2000 | Parise | |

(Continued)

FOREIGN PATENT DOCUMENTS

| | | |
|---|---|---|
| DE | 102009040067 A1 | 3/2011 |
| JP | 2010211963 A | 9/2010 |

(Continued)

OTHER PUBLICATIONS

International Search Report for Serial No. PCT/US2015/0498830 dated Feb. 18, 2016.

(Continued)

*Primary Examiner* — Zhongqing Wei
(74) *Attorney, Agent, or Firm* — K&L Gates LLP (57) ABSTRACT

A system for thermal management and structural containment includes an enclosure, a heat source disposed within the enclosure; and a wick encompassing at least a portion of an outer surface of the heat source.

22 Claims, 6 Drawing Sheets

(56) References Cited

U.S. PATENT DOCUMENTS

| | | |
|---|---|---|
| 6,106,972 A | 8/2000 | Kokubo et al. |
| 6,261,716 B1 | 7/2001 | Hall et al. |
| 6,512,347 B1 | 1/2003 | Hellmann et al. |
| 6,533,031 B1 | 3/2003 | Garcia et al. |
| 6,705,418 B2 | 3/2004 | Wessman |
| 6,840,050 B2 | 1/2005 | Pode |
| 7,297,438 B2 | 11/2007 | Kimoto |
| 7,399,551 B2 | 7/2008 | Yagi et al. |
| 7,795,845 B2 | 9/2010 | Cho |
| 8,231,996 B2 | 7/2012 | Howard et al. |
| 8,273,474 B2 | 9/2012 | Al-Hallaj et al. |
| 8,889,282 B2 | 11/2014 | Goesmann et al. |
| 9,005,800 B2 | 4/2015 | Park et al. |
| 2006/0099540 A1 | 5/2006 | Avelar |
| 2006/0162907 A1* | 7/2006 | Wu .................. F28D 15/046 165/104.26 |
| 2006/0213646 A1* | 9/2006 | Hsu .................. F28D 15/046 165/104.26 |
| 2007/0151709 A1* | 7/2007 | Touzov ............ F28D 15/0241 165/104.26 |
| 2007/0267178 A1* | 11/2007 | Hou .................. F28D 15/046 165/104.26 |
| 2007/0267180 A1* | 11/2007 | Asfia ................ F28D 15/046 165/104.26 |
| 2008/0280192 A1* | 11/2008 | Drozdz .................. B60K 6/28 429/62 |
| 2008/0299449 A1 | 12/2008 | Yun et al. |
| 2010/0266885 A1 | 10/2010 | Lee |
| 2011/0183178 A1* | 7/2011 | Sohn ................ F28D 15/0233 429/120 |
| 2011/0206965 A1* | 8/2011 | Han .................. F28D 15/0233 429/120 |
| 2011/0293982 A1 | 12/2011 | Martz et al. |
| 2011/0293985 A1 | 12/2011 | Champion et al. |
| 2012/0055725 A1 | 3/2012 | Mizoguchi et al. |
| 2012/0107635 A1 | 5/2012 | Hirsch et al. |
| 2012/0107664 A1 | 5/2012 | Lee et al. |
| 2012/0148881 A1* | 6/2012 | Quisenberry ....... H01M 10/613 429/50 |
| 2012/0164507 A1 | 6/2012 | Lachenmeier et al. |
| 2012/0171523 A1 | 7/2012 | Yang et al. |
| 2015/0280295 A1 | 10/2015 | Bhunia et al. |
| 2017/0040654 A1 | 2/2017 | Bhunia et al. |
| 2017/0047625 A1 | 2/2017 | Bhunia et al. |

FOREIGN PATENT DOCUMENTS

| | | |
|---|---|---|
| JP | 2011-007365 A | 1/2011 |
| JP | 2013-161528 A | 8/2013 |
| WO | 2004/081686 A2 | 9/2004 |
| WO | 2014176320 A2 | 10/2014 |
| WO | WO 2014176320 A2 * | 10/2014 .......... H01M 2/0267 |

OTHER PUBLICATIONS

International Preliminary Report on Patentability for International Application No. PCT/US2015/049830 dated Mar. 13, 2018.
International Search Report for International Application No. PCT/US2015/049830 dated Feb. 18, 2016.
Communication pursuant to Article 94(3) EPC issued by the European Patent Office in European Application No. 15770742.3 dated May 28, 2019, 5 pages.

\* cited by examiner

MULTI-FUNCTIONAL HIGH TEMPERATURE STRUCTURE FOR THERMAL MANAGEMENT AND PREVENTION OF EXPLOSION PROPAGATION

BACKGROUND

1. Field of the Invention

This invention relates to phase-change cooling systems, and more particularly phase-change systems that use a wick.

2. Description of the Related Art

Li-ion battery arrays are subject to lower than desired lifetime, are subject to reliability issues and may experience catastrophic failure due to excess heat build-up during certain charge and discharge operations. These concerns may be addressed by providing for excess battery capacity to reduce the charge/discharge rate for any particular one battery in the array. The arrays may also be actively cooled to reduce cell case temperature. For example, air or electrically non-conductive liquid may be circulated around the array to transport excess heat away from the array. Alternatively, a phase change material may be provided around the array to absorb excess heat. Several layer of safety features are generally required to provide fail-safe systems.

A need still exists to provide for improved thermal management and physical safety features for batteries and other heat sources.

SUMMARY

A system for thermal management and structural containment may include an enclosure, a heat source disposed within the enclosure and a wick encompassing at least a portion of an outer surface of the heat source. The system may also include a working fluid disposed within the enclosure and that is in communication with the wick. The enclosure may be substantially vapor tight. The wick may include a material selected from the group consisting of ceramic, cellulose, glass, graphite, or polymer fibers, and may include a fabric selected from the group consisting of non-woven, woven, knitted, or braided fibers. The wick may be a multiscale wick, and may have a plurality of wick layers, each adjacent layer having a different pore size distribution. In one embodiment, the system may also include a first multiscale wick on a first interior wall of the enclosure, and may include a heater blanket disposed on an exterior wall of the enclosure, the exterior wall on an opposite side of the first interior wall. A second multiscale wick may also be included on a second interior wall of the enclosure that opposes the first interior wall. The heat source may be an energy storage device that is one of a first plurality of energy storage devices disposed within the enclosure. The first plurality of energy storage devices may be stacked in a mono-block configuration on the first multiscale wick structure, and each of the first plurality of energy storage devices may have an outer surface substantially encompassed by a respective one of a plurality of woven ceramic wicks. The system may also include a secondary multiscale wick extending along the plurality of woven ceramic wicks, the secondary multiscale wick in liquid communication with the plurality of woven ceramic wicks. The secondary multiscale wick may extend along a radius R of each of the plurality of woven ceramic multiscale wicks to increase a surface area of liquid contact between the secondary multiscale wick and each of the plurality of woven ceramic multiscale wicks. In other embodiments, the system may include a second plurality of heat sources stacked in the mono-block configuration on the first multiscale wick structure, the second plurality of heat sources each having an outer surface substantially encompassed by a respective one of a plurality of woven ceramic multiscale wicks. An interior frame structure may be provided between the first and second pluralities of stacked heat sources.

Another system for thermal management and structural containment has an enclosure, a battery disposed within the enclosure, a woven ceramic jacket encompassing at least a portion of an outer surface of the battery, and a working fluid in liquid communication with the woven ceramic jacket. The system may also have a first multiscale wick structure on an interior side of a first wall of the enclosure, and a heater disposed on an exterior side of the first wall, the heater disposed in complementary opposition to the first multiscale wick structure. The battery may be one of a first plurality of batteries disposed within the enclosure. The first plurality of batteries may be stacked in a mono-block configuration, and, in one embodiment, such batteries may also be stacked on an interior base wick. The system may also include a second plurality of batteries stacked in the mono-block configuration on the interior base wick, the second plurality of batteries each having an outer surface encompassed by a respective one of a plurality of woven ceramic jackets. An interior frame structure may also be provided between the first and second pluralities of stacked batteries.

A method of transferring heat includes receiving thermal energy in a multiscale wick substantially encompassing an outer surface of a battery in an enclosure, and transferring thermal energy between the multiscale wick and a first multiscale wick structure on an interior side of a first wall of the enclosure. The method may also include generating vapor in the multiscale wick in response to receipt of the thermal energy, and generating condensate in the first multiscale wick structure. In one embodiment, heat is transferred from the battery to the multiscale wick. In some embodiments, the method may also include providing structural reinforcement against radial expansion of the battery by the multiscale wick. In one embodiment of the method referred to as "reverse operation," the method may include generating vapor in the first multiscale wick structure on the interior side of the first wall of the enclosure in response to receipt of the thermal energy and generating condensate in the multiscale wick that substantially encompasses the outer surface of the battery so that heat may be transferred from the multiscale wick to the battery.

BRIEF DESCRIPTION OF THE DRAWINGS

The components in the figures are not necessarily to scale, emphasis instead being placed upon illustrating the principals of the invention. Like reference numerals designate corresponding parts throughout the different views.

DETAILED DESCRIPTION

A system is disclosed that provides a single unique solution for both thermal management and failure containment of heat sources such as batteries. Under normal operating conditions, the system acts as a liquid-to-vapor phase change thermal management system. Under fault conditions, the system behaves as a firewall and a failure containment system.

Figure 1:
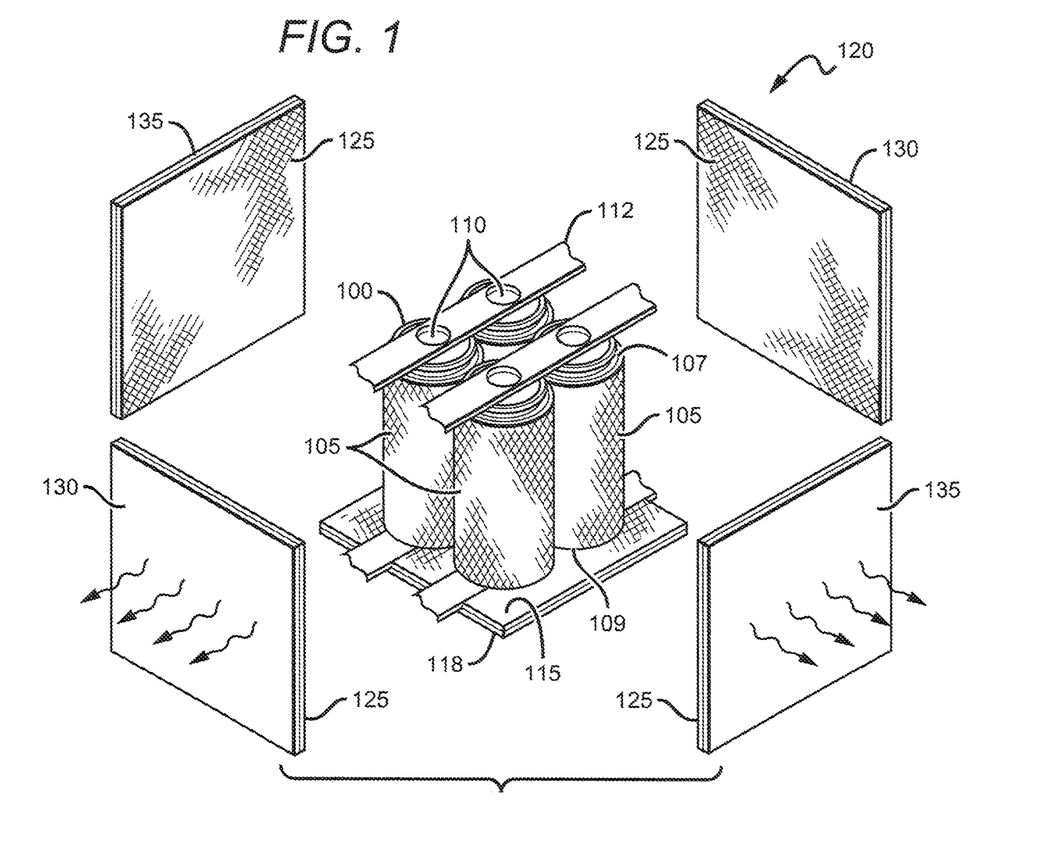
FIG. 1 is an exploded perspective view of the evaporation condensation heat transfer system in an enclosure containing a plurality of heat sources wrapped in respective wicks.

FIG. 1 is an exploded perspective view of a system for thermal management and structural containment of multiple heat sources in an enclosure. A plurality of heat sources, such as heat-generating electrical components or energy storage devices in the form of battery cells ("batteries") 100, each have their surfaces wrapped or otherwise substantially covered in respective wicks 105. A first terminal side 107 of each battery cell 100 is preferably substantially free of wick material to facilitate electrical connection of the top electrical contact 110 onto a conducting lead 112. A second terminal surface 109 of each battery 100 is partially covered with a bottom wick (not shown), and the battery cells 100 may each be seated on an interior base wick 115 disposed on or attached to a first interior wall 118 of the enclosure 120 so that the interior base wick 115 is in fluid communication with the bottom wick (not shown). The enclosure may be vapor tight or substantially vapor tight to reduce loss of an included working fluid to the atmosphere. In other embodiments the plurality of heat sources may be a single heat source present in the enclosure. Also, although illustrated as cylindrical, the batteries 100 or other heat-generating devices may be square, rectangular or other shape and in physical contact with a wick wrapped about their exterior surfaces to facilitate heat transfer when the wick is charged with a liquid. The wick structure can be designed to provide physical containment of the cell in case of failures. If the battery overheats, the porous layer acts as a firewall shielding the neighboring cells. Ultimately in the case of breaching of the cell walls due to overheating and runaway exothermic reaction, the fibrous jacket provides additional containment.

Interior wick structures 125 may be disposed on pairs of opposing interior walls (130, 135), with each interior wick structure 125 in liquid communication with the interior base wick 115 on the bottom of the enclosure 120 to transport liquid using a wicking action between them. Each wick 105, bottom wick (not shown), interior base wick 115, and the interior wick structures 125 are preferably electrically non-conductive and capable of withstanding temperatures in excess of 1000° C. Although the heat sources are illustrated as seated in a bottom portion of the enclosed heat chamber, the heat sources may be seated on one of the walls of the opposing pairs of interior walls (130, 135) or may span the width or height of the enclosure. The opposing pairs of interior walls (130, 135) may be formed of a heat conducting material such as metal to receive excess heat from the interior wick structure 125. The enclosure 120 may be charged with a working fluid that is preferably a dielectric liquid, such as 3M NOVEC 7200, that has a freeze point of −138° C., boiling point of 76° C. (at 1 atm. pressure) and a critical temperature of ~170° C. thus enabling a typical battery operating range of −40 to +70° C. The saturation pressure may be slightly below 1 atm. when the ambient temperature (outside battery box) is 70° C. In embodiments where the enclosure is not cuboid, such as an enclosure in the form of a sphere or cylinder, "pairs of opposing interior walls" may refer to wall segments on opposite sides of the enclosure from one another.

Figure 2A:
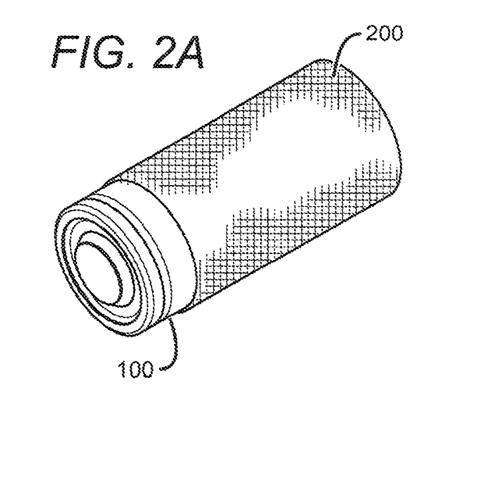
FIGS. 2A and 2B are perspective views of one embodiment of a heat source wrapped in a multiscale wick before and after deformation, respectively.
Figure 2B:
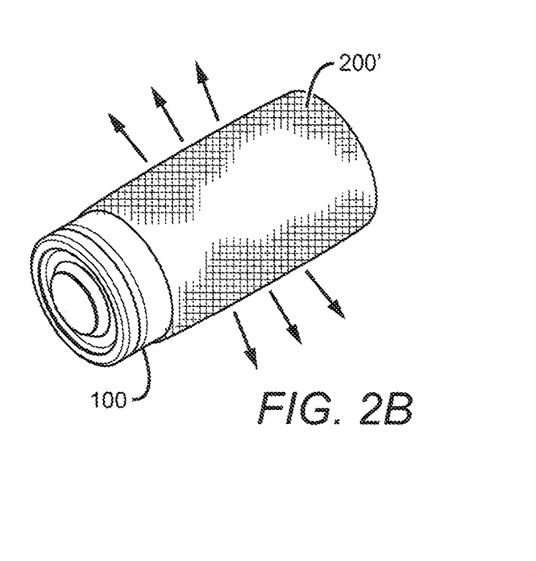

FIGS. 2A and 2B are perspective views of one embodiment of a single heat source that is cylindrical and that has its outer surface substantially encompassed by a wick for use in the enclosure illustrated in FIG. 1. The single heat source may be one of the cylindrical battery cells 100 illustrated in FIG. 1, including, by way of example only, a high-power lithium iron phosphate (LFP) rechargeable battery rated at 3.2 nominal volts and 2.6 Ahr and configured to charge and discharge at a high current rate, for example 10 A current at an ambient temperature of 40° C. In alternative embodiments, the single heat source may be a lithium cobalt oxide rechargeable battery or lithium manganese iron phosphate rechargeable battery or other type of rechargeable battery or energy storage device.

In a preferred embodiment, the battery 100 may have a substantial portion of its outer surface encompassed by a multiscale wick 200 that may be formed of high temperature materials such as ceramic (alternatively referred to as a "ceramic jacket" or "ceramic multiscale wick") or glass fibers. As used herein, the phrase "multiscale wick" may refer to a wick structure that has different average pore sizes and distribution to provide multiple effective pore sizes for capillary pumping. Examples of multiscale wicks may include a single-layer wick having fibers of different diameters that are stacked (i.e., more than one fiber deep) or sprayed onto a surface; a plurality of layers of fibers, with each adjacent layer having a different pore size distribution (see FIG. 2C); or one or more layers of braided or knitted fibers. For example, a ceramic multiscale wick may be formed from braided or knitted ceramic fibers or from a nonwoven ceramic process. In one embodiment, the multiscale wick 200 may be formed of a woven structure having a wall thickness of approximately 1 mm. In another embodiment, the fiber diameter may be approximately 10 nm to 300 μm and the fiber layer forming the wick may be between 5 microns and 5 mm depending on the type and size of the battery. In other embodiments, the pores may be filled with a matrix (e.g., powders). The fibers may also be treated to improve wetting. One example of a ceramic multiscale wick material is based on the Nextel™ family of fibers sold by 3M™ used for insulation. The woven ceramic multiscale wick 200 provides the dual roles of thermal management and failure containment.

During operation, as used in the enclosure 120 of FIG. 1, excess heat emitted by the battery 100 may induce a liquid-to-vapor phase change of a portion of the liquid in the liquid-filled multiscale wick 200, so that the excess heat is effectively transported away from the battery cell through the liquid-to-vapor phase change and transport of the created vapor away from the battery 100. As best illustrated in FIG. 2B, the high tensile strength of the woven ceramic jacket 200' may also provide supplemental structural reinforcement against radial expansion of the battery to assist pressure containment of the battery 100 and to contain debris if the battery ruptures. The wick may also help to isolate the neighboring cells from overheating, thereby averting a cascading effect and preventing catastrophic failure.

Figure 2C:
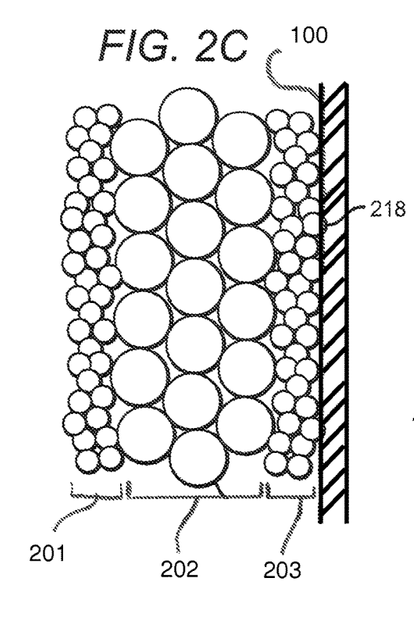
FIG. 2C is a cross-sectional view of one embodiment of a heat source multi-scale wick composed of a plurality of layers of fibers, with each adjacent layer having a different pore size distribution.

FIG. 2C shows an example of the multiscale feature of the wick structure. The multiscale wick may have multiple layers, such as 201, 202, and 203. Each layer (201, 203, 203) may have a different pore size and distribution. The finer pore structures 218 are preferably open to vapor space and adjacent to the battery 100.

Figure 3:
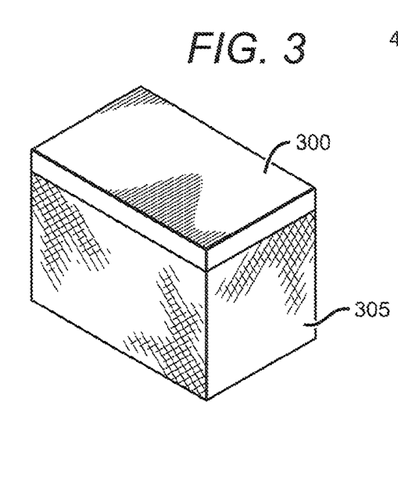
FIG. 3 is a perspective view of a heat source in the form of a rectangular prism that is wrapped in a multiscale wick.

FIG. 3 is a perspective view of a single heat source in prismatic shape such as a rectangular prism that is wrapped in a multiscale wick for use in the enclosure illustrated in FIG. 1. The heat source may be heat generating electronics or a battery 300 encompassed by or wrapped in a woven ceramic jacket 305.

Figure 4:
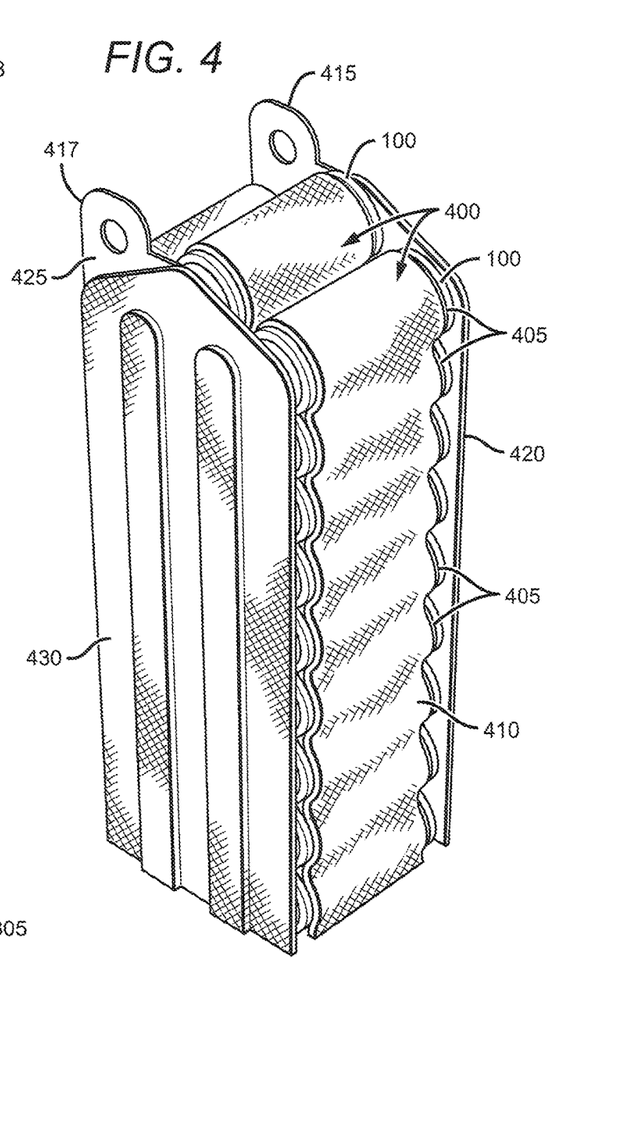
FIG. 4 is a perspective view of one embodiment of a plurality of heat sources stacked in a mono-block configuration, each heat source wrapped in a respective primary jacket and the mono-block wrapped in secondary jacket.

FIG. 4 is a perspective view of one embodiment of a plurality of heat sources, such as cylindrical battery cells, stacked in a mono-block configuration to form an array of parallel-stacked batteries for use in an enclosure. As referred to herein, the term "mono-block" means a stacked plurality of heat sources that are preferably oriented parallel to one another. Each individual cylindrical battery cell 100 of the mono-block 400 may be substantially encompassed or wrapped by a multiscale wick that may be a woven ceramic wick (alternatively referred to as a "primary jacket") 405. The primary jacket 405 may have a wall thickness of approximately 1 mm. In an alternative embodiment, the primary jacket may be a wick that is not a multiscale wick. A secondary multiscale wick that may be a woven ceramic wick (alternatively referred to as a "secondary jacket") 410 may encompass or wrap the primary jackets 405 of the mono-block 400. In alternative embodiments, either or both of the primary and secondary jackets (405, 410) may be formed of braided or knitted fibers or from a nonwoven process. Also, rather than ceramic based, either of the primary or second jackets may also be formed from glass or from high-temperature synthetic fibers such as Kevlar. The primary and secondary jackets (405, 410) are in liquid communication with one another so liquid may be communicated between them. The mono-block 400 may be formed by a plurality of stacked columns, or a single stacked column, and may be axially supported by complementary panels (415, 417) that are spaced apart at a distance that approximates the length of the batteries 100 to facilitate electrical connection of battery terminals at the complementary panels (415, 417). The secondary jacket 410 may provide at least partial radial support for the batteries 100 so that they do not fall out of the mono-block 400. Each of the complementary panels (415, 417) may have their external surfaces (420, 425) covered with a wick that may be a multiscale wicking layer 430. In FIG. 4, the mono-block encompasses twenty-four batteries. During normal operation, the primary and secondary cell jackets (405, 410) provide strong capillary force to pull dielectric liquid towards an outer surface of each of the plurality of batteries 100 as other portions of the dielectric liquid evaporate at the battery due to absorption of excess heat from the batteries 100.

Figure 5:
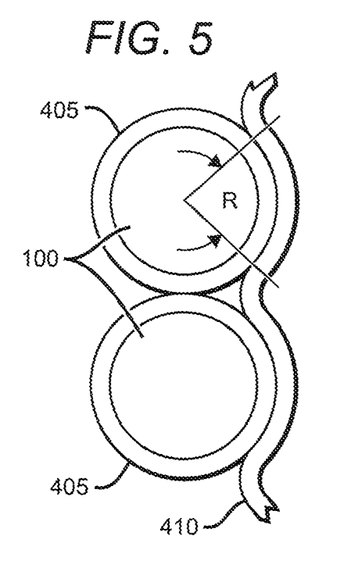
FIG. 5 is a cutaway view illustrating two battery cells wrapped in respective first multiscale wicks with a second multiscale wick extending along and partially conforming to exterior surfaces of the first multiscale wicks.

Liquid communication between and among the primary jackets 405 is enhanced by liquid communication along the secondary jacket 410. Conforming the secondary jacket 410 shape to the shape of each primary jacket 405 may enhance such liquid communication. For example, rather than forming the secondary jacket in a plane having flat exterior surfaces, the secondary jacket 410 may extend along a partial radius R of each respective woven ceramic jacket 405 that encompasses the outer cylindrical surface of each battery cell 100. (See FIG. 5). Other arrangements including integrally woven joint tubes and multilayer fabrics can be devised as a single jacket serving both roles. In another embodiment, the secondary jacket may be omitted, with liquid being transported directly from the interior base wick 115 to the primary jacket (see FIG. 1) or from a liquid store (not shown) in liquid communication with the primary jacket.

In an alternative use of the mono-block 400, the primary and secondary jackets (405, 410) may receive heat energy in the form of vapor from locations removed from the mono-block 400. The vapor may condense on the secondary jacket 410, and/or through the secondary jacket 410 to the primary jacket 405, for communication of the condensed liquid by wicking action to the batteries 100. In this manner, the batteries may receive excess heat energy through the primary and secondary jackets (405, 410) rather than expelling excess heat energy from the batteries 100 as described above. This method may be useful for warming batteries 100 for use in climates that would otherwise be too cold for ideal operation at startup. As the batteries 100 are used and begin to generate their own excess heat, the transfer of heat energy between the batteries 100 and locations removed from the mono-block may be reversed, with vapor created on the outer surface of the batteries 100.

Figure 6A:
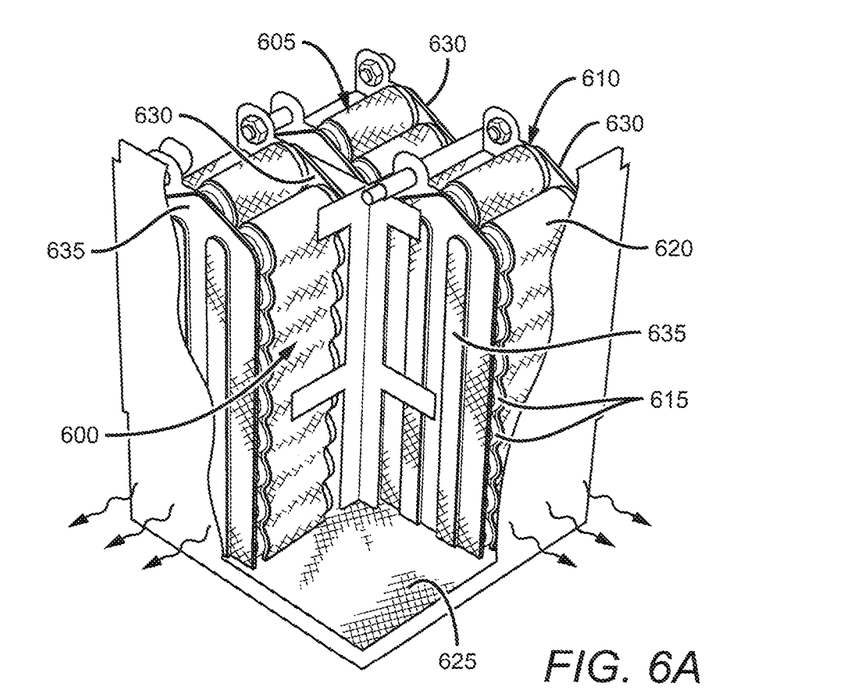
FIG. 6A is a perspective view of a plurality of mono-blocks seated in the enclosure.

FIG. 6A is a perspective cut-away view of a plurality heat sources arranged in several mono-blocks in an enclosure. Each mono-block (600, 605, 610) is illustrated as consisting of cylindrical battery cells 100, although other heat sources may be used. Each mono-block (600, 605, 610) may have an identical number of columns and batteries 100, or each mono-block may have a unique combination of columns, batteries and heat source types. For example, each column in each mono-block may consist of a single battery or a plurality of batteries. Each battery 100 has a substantial portion of its outer cylindrical surface individually encompassed by or wrapped in a primary jacket 615. A secondary jacket 620 or multiple secondary jackets may wrap around an exterior of the primary jackets 615 of each mono-block to provide liquid communication between and among the batteries 100 of each respective mono-block (600, 605, 610). The secondary jacket 620 of each mono-block may wrap around and under the mono-block so that a portion of the secondary jacket is sandwiched between the mono-block and a battery base multiscale wick 625. When the battery base multiscale wick 625 is charged with a reserve liquid, such as a dielectric liquid, the dielectric liquid may be drawn up from the battery base multiscale wick 625 into the secondary jacket 620 for further distribution between and among the primary jackets 615 in each of the mono-blocks (600, 605, 620). The wick structures are designed to facilitate electrical connections.

Each mono-block has complementary panels (630, 635) spaced apart at a distance that approximates the length of the batteries 100 to facilitate electrical connection between battery terminals on the batteries and terminals on the complementary panels (630, 635). Through suitable electrical connection between the complementary panels, positive terminals of a first mono-block may be connected to negative terminals of a second mono-block for suitable electrical configuration.

Figure 6B:
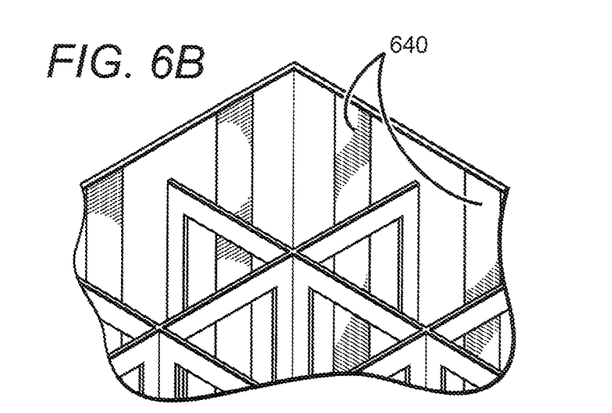
FIG. 6B is a close-up perspective view of one interior corner of the enclosure.

FIG. 6B is a close-up perspective view of one interior corner of the enclosure. A plurality of multiscale wicks 640 extend along an interior surface of the interior walls of the enclosure. Such wicks may be used for condensation, evaporation and fluid transport. In one embodiment, the multiscale wicks 640 enable gravity-independent operation by enabling liquid to wick regardless of the enclosure gravitational orientation.

Figure 7:
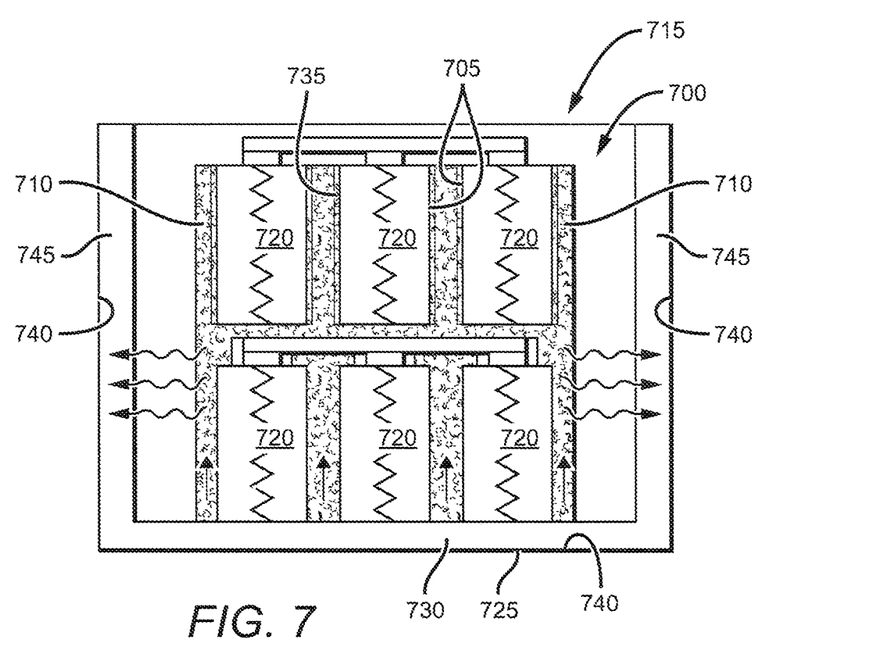
FIG. 7 illustrates operational flow of vapor and liquid in the enclosure containing a plurality of heat sources.

FIG. 7 is a sectional view of a multi-cell battery array 700 having primary and secondary jackets (705, 710) and enclosed in an enclosure that is a battery box 715 to illustrate operation. Each cell 720 is surrounded by respective primary cell jackets 705 that may each be formed of a porous woven structure having a wall thickness of approximately 1 mm. The array of parallel cells 720, forming a mono-block of a larger battery system, is also surrounded by a porous wick structure, called the secondary cell jacket 710. The primary and secondary porous structures (705, 710) may be physically connected to each other to enable liquid communication between them. The open space around the cells and blocks of cells allow rapid vapor transport. A bottom wall 725 of the battery array is also covered with a thin porous layer 730. Under normal operating condition of cell discharge and charge, the primary and secondary cell jackets (705, 710) act as a wick, pulling the dielectric liquid from the bottom of the battery box to an exterior surface 735 of each cell (i.e., the cell casing) by capillary action. The liquid near the cell wall vaporizes after absorbing the heat generated inside the cell 720. The vapor condenses on inner walls 740 of the battery box 715. The condensate accumulates at the bottom, by gravitational force or by capillary force of similar porous structures 745 implemented on the inner walls 740 of the battery box 715 (in case gravity independence is desired). The phase change and liquid/vapor circulation continues to transfer heat from the cell walls 735 to the battery wall 725, from where it is rejected into the ambient. Fundamentally the concept of operation is an evaporation condensation heat transfer system in an enclosure, a passive heat dissipation and spreading technology.

Cooling capability in excess of 100 W/cm2 can be achieved by designing the multiscale pores (10 nm to 1 mm) of the primary and secondary cell jackets (705, 710). The cooling capability may far exceed the typical power dissipation density of a cell 720 even under the most severe discharge rate condition of 30 C (i.e., 30 times faster than the rated capacity of the cell or battery). Due to the connected vapor space within the battery case 700 and the identical vapor saturation temperature, a nearly isothermal condition can be achieved among cells 720 inside a large battery module 710, even with different heat dissipation between the cells 720. A small overpressure gas release valve may be added for safety.

Dielectric liquid, such as 3M NOVEC 7200 has a freeze point of −138° C., boiling point of 76° C. (at 1 atm. pressure) and a critical temperature of ~170° C. Thus it is suitable for the entire ambient temperature range under which the battery 700 may operate (−40 to +70° C.). The saturation pressure is slightly below 1 atm. when the ambient temperature (outside the battery box 715) is 70° C. The small pressure differential eases the strength and thickness requirements of the battery box wall 725, resulting in a lightweight battery with effective heat conduction through the wall 725. The battery preferably sealed to accomplish the operation described above, similar to current lead acid batteries. A gas release valve can provide a vapor escape path in case of overpressure if the system is overheated.

Figure 8:
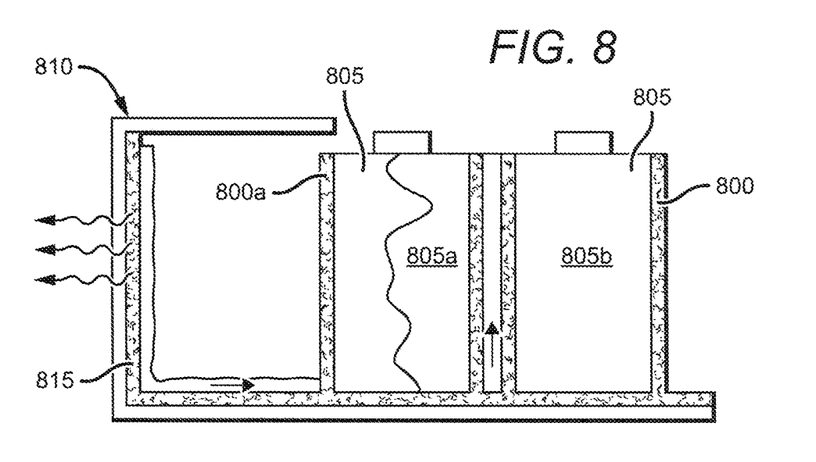
FIG. 8 illustrates use of a multiscale wick wrapped around a failed heat source for thermal isolation and debris containment.

FIG. 8 illustrates the features of thermal management and physical safety in a system having a plurality of heat sources in physical contact with respective ceramic multiscale wicks ("primary jackets") wrapped about their exterior surfaces. During operation, there is preferably a continuity of liquid supply saturating the primary jackets (800, 800a) of each of the cells 805 in the battery 810, which are physically connected. Thus, when a single cell 805a overheats due to a local failure, the cooling mechanism represented by its primary jacket 800a and available liquid supply first autoregulates to bring more liquid from the secondary jackets (not shown), interior wick structures 815, and from surrounding cells (liquid quenching). If the limit of this self-adaptive liquid quenching mechanism is reached for the single cell 805a, its respective primary jacket 800a starts to dry up and, as its temperature rises, the respective primary jacket 800a rapidly becomes an insulator, shielding neighboring cells 805b from the local heat. Finally, in case of a cell failure and rupture of the single cell 805a, the woven structure of the primary jacket 800a acts not only as a firewall due to its capability of withstanding high temperature (>1000° C.) but also as a physical containment due to the strength of the woven fiber. The deformation and strength of the primary jacket 800a depends on a number of parameters, such as the type of fiber and the weave architecture.

Figure 9:
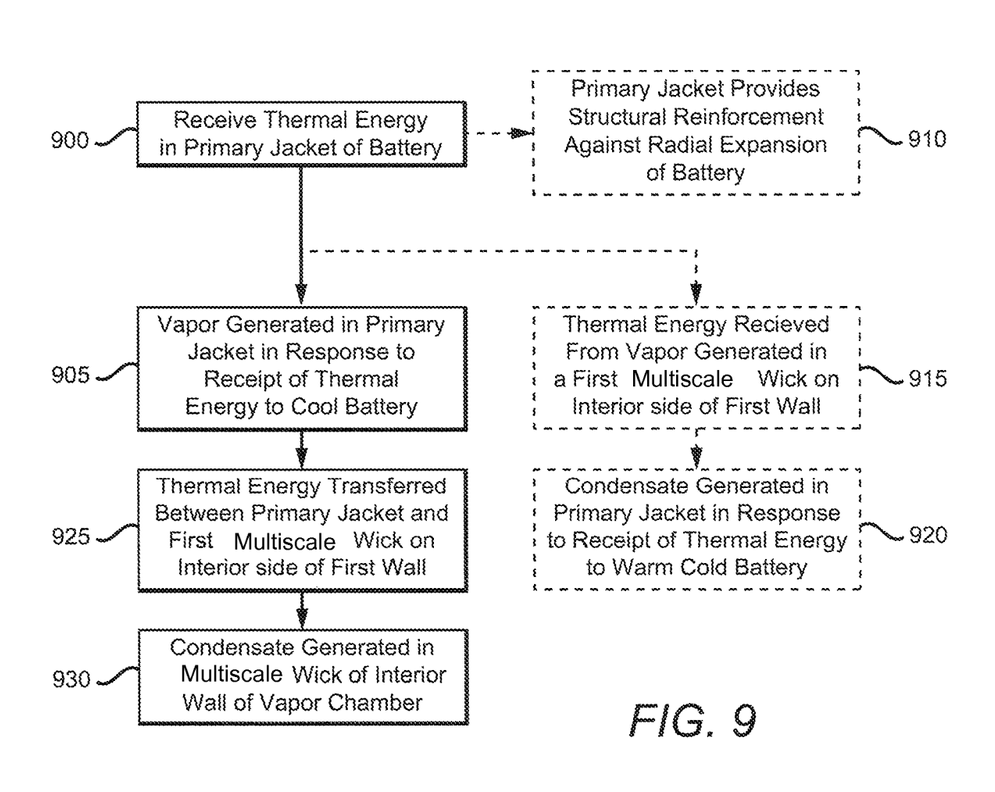
FIG. 9 is a flow diagram illustrating one embodiment of thermal management of a heat source wrapped in a multiscale wick in the enclosure.

FIG. 9 is a flow diagram illustrating one embodiment of a method for "forward" and "reverse" operation of a system for thermal management and structural containment of a multiscale wick-wrapped battery enclosed in an enclosure. Thermal energy may be received in a primary jacket of a battery (block 900). In one embodiment described for convenience as "forward operation," vapor is generated in the primary jacket in response to receipt of the thermal energy that may be excess thermal energy received from the battery (block 905). The liquid-to-vapor phase change in the primary jacket serves to draw out excess thermal energy from of the battery. In one embodiment of the method of thermal management and structural containment when excess heat build-up in the battery causes radial expansion and/or containment failure of the battery, the primary jacket may provide structural reinforcement against radial expansion (block 910) regardless of the availability of liquid in the primary jacket.

In another embodiment described for convenience as "reverse operation," thermal energy is received in the primary jacket of the battery by means of vapor generated in a first multiscale wick on an interior side of a first wall of the enclosure (block 915). The vapor in the first multiscale wick may be created from a liquid-to-vapor phase change prompted by thermal energy received from a heat source exterior to the enclosure or from a heat source mounted to an exterior of the enclosure for communication to the primary jacket. In one embodiment, the heat source is a heater blanket. The vapor-to-liquid phase change in the primary jacket (block 920) serves to warm the battery for its use in environments that would otherwise be too cold for ideal operation of the battery at startup. In this "reverse operation" mode, working fluid in the suspended form of vapor is in communication with the primary jacket for the vapor-to-liquid phase change heat transfer operation.

In forward operation, the vapor generated in the primary jacket (block 905) is transferred to the first multiscale wick on the interior side of the first wall of the enclosure (block 925). The vapor may undergo a vapor-to-liquid phase change as it is cooled by the first multiscale wick to form condensate (block 930) to finally draw the excess heat energy away from the battery. The condensate may then be wicked or otherwise transported back to the primary jacket for receipt of additional thermal energy to accomplish a liquid-to-vapor phase change for transport of excess heat energy from the battery back to the first multiscale wick for transport of the thermal energy out of the enclosure.

EXAMPLES

Example 1

Figure 10:
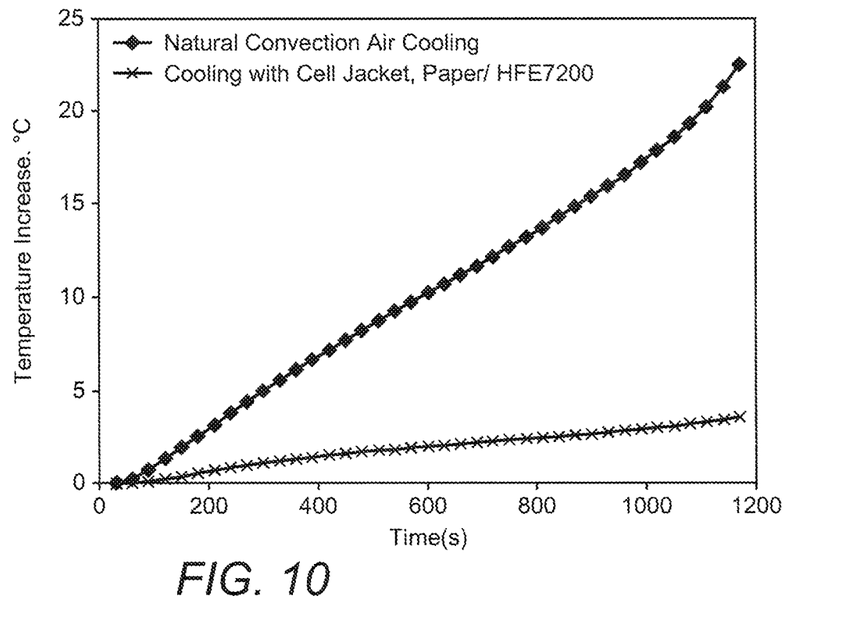
FIG. 10 is a graph illustrating Li-ion cell temperature vs. time during rapid discharge, first with one embodiment of a liquid-charged porous wick wrapped around the cell and then without the porous wick wrapped around the cell.

A rechargeable lithium iron phosphate (LFP) battery, cylindrical in shape with nominal dimensions 26 mm in diameter and 65 mm in height (26650 LFP, K2 Energy) is placed inside a vapor-tight enclosure. Electrical leads are connected to the cell using feedthroughs in the cover of the enclosure. Certain amount of dielectric liquid 3M NOVEC 7200 is placed at the bottom of the enclosure. The battery is first charged at 0.5 C rate to 3.65 V and then further charged at constant voltage with the current decreasing over time down to 65 mA. The battery is then discharged fully to 0% SOC under a constant resistance load, starting with 10 Amp current. The temperature of the cell is recorded as a function of time during the discharge. The ambient temperature around the enclosure is kept at 40° C. The temperature of the cell wall is rising as shown in FIG. 10 by 23° C. at 0% SOC.

Example 2

A cylindrical rechargeable 26650 LFP cell (26650, K2 Energy) is covered using 250 microns thick non-woven porous structure on the cylindrical cell wall and placed inside a vapor-tight enclosure. The charge and discharge process of example 1 is repeated. The temperature rise during the discharge is shown in FIG. 10. The effect of the evaporation-condensation process inside the chamber reduces the temperature increase to only 3° C.

Example 3

Figure 11:
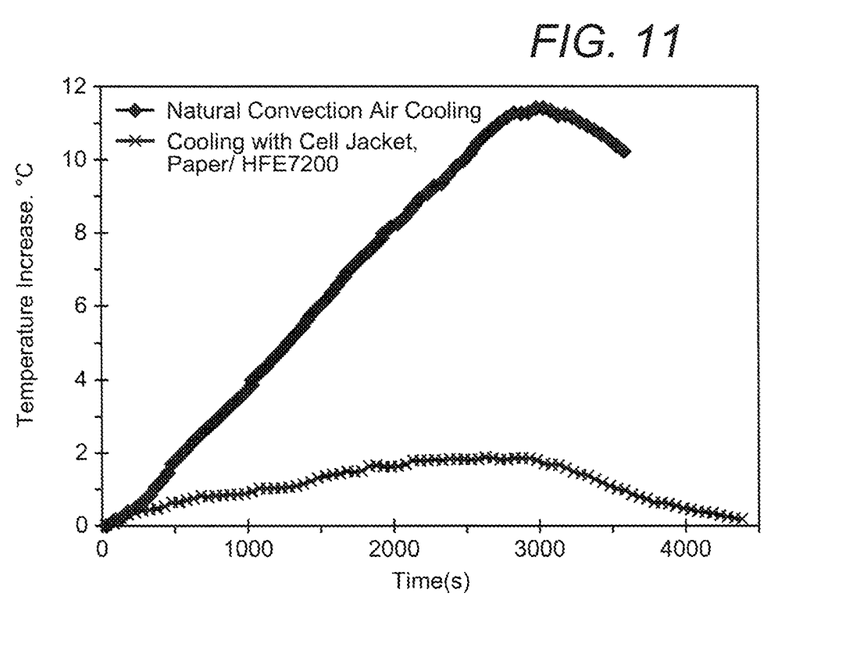
FIG. 11 is a graph illustrating Li-ion cell temperature vs. time during rapid charge, first with one embodiment of a liquid-charged porous wick wrapped around the cell and then without the porous wick wrapped around the cell.

The experiment in example 1 is repeated except that the charge is carried at a constant current (CC) 4 Amp (1.5 C) charge until cell voltage reaches 3.65 V (approximately at ~3000 s), and then constant voltage charge until current trickles down 65 mA. The ambient temperature is 60° C. The temperature of the cell is recorded as a function of time during the charge and the temperature peaks just after the constant current step at 11° C., as shown in FIG. 11.

Example 4

The cell is covered with a non-woven porous structure as in example 2 and the charge procedure of example 3 is followed. In this example, the temperature increase of the cell peaks at ~2° C. (FIG. 11) demonstrating the dramatic effect of the cooling process provided by the addition of the porous wick.

While various implementations of the application have been described, it will be apparent to those of ordinary skill in the art that many more embodiments and implementations are possible that are within the scope of this invention.

We claim:

1. A system for thermal management and structural containment, comprising:
an enclosure;
at least one battery disposed within the enclosure;
a battery surface wick encompassing at least a portion of an outer surface of the at least one battery;
an interior base wick disposed on and in thermal communication with an inner surface of a first wall of the enclosure, wherein the interior base wick is in capillary force communication with the battery surface wick; and
a working fluid in capillary force communication with the battery surface wick.

2. The system of claim 1, further comprising:
an interior wick structure disposed on and in thermal communication with an interior surface of a second wall of the enclosure, wherein the interior wick structure is in capillary force communication with the interior base wick.

3. The system of claim 2, further comprising:
a heater disposed on an exterior side of a second wall, the heater disposed in complementary opposition to the interior wick structure.

4. The system of claim 1, wherein the at least one battery comprises a first plurality of batteries disposed within the enclosure,
wherein a portion of an outer surface of each battery of the first plurality of batteries is encompassed by a battery surface wick, and
wherein the battery surface wick of each battery of the first plurality of batteries is in capillary force communication with the interior base wick.

5. The system of claim 4, wherein the first plurality of batteries is stacked in a mono-block configuration.

6. The system of claim 5, wherein the first plurality of batteries stacked in a mono-block configuration are stacked on the interior base wick.

7. The system of claim 6, further comprising:
a second plurality of batteries stacked in a mono-block configuration on the interior base wick, wherein each battery of the second plurality of batteries comprises an outer surface encompassed by a battery surface wick, and
wherein the battery surface wick of each battery of the second plurality of batteries is in capillary force communication with the interior base wick.

8. The system of claim 7, further comprising:
an interior frame structure between the first plurality of batteries and the second plurality of batteries.

9. The system of claim 1, wherein the working fluid is a dielectric liquid.

10. The system of claim 1, wherein the enclosure is a vapor-tight or substantially vapor-tight enclosure.

11. The system of claim 1, further comprising an operational flow of the working fluid, wherein the operation flow is defined by:
evaporation of a portion of the working fluid from the battery surface wick upon receiving heat from the at least one battery;

condensation of at least a portion of the evaporated portion of the working fluid on the interior base wick; and fluid transportation by a capillary force of the condensed evaporated portion of the working fluid from the interior base wick to the battery surface wick.

12. The system of claim 2, wherein any one or more of the battery surface wick, the interior wick structure, and the interior base wick comprise one of ceramic, cellulose, glass, graphite, or polymer fibers.

13. The system of claim 2, wherein any one or more of the battery surface wick, the interior wick structure, and the interior base wick comprise a fabric of non-woven, woven, knitted, or braided fibers.

14. The system of claim 2, wherein any one or more of the battery surface wick, the interior wick structure, and the interior base wick comprise a multi scale wick structure.

15. The system of claim 14, wherein the at least one battery comprises a first terminal surface and a second terminal surface, and wherein the second terminal surface is partially covered by a bottom wick.

16. The system of claim 15, wherein the interior wick structure of the second wall is in capillary force communication with the battery surface wick via the bottom wick.

17. The system of claim 14, wherein the second wall is a base wall or a side wall of the enclosure.

18. The system of claim 1, wherein the battery surface wick is a multi scale wick.

19. The system of claim 14, wherein the multi scale wick comprises a plurality of wick layers and wherein each adjacent wick layer comprises a different pore size distribution.

20. The system of claim 4, further comprising a secondary wick in capillary force communication with at least one battery surface wick of the first plurality of batteries and extending along at least a portion of an outer surface of the at least one battery surface wick of the first plurality of batteries.

21. The system of claim 2, further comprising an operational flow of the working fluid, wherein the operation flow is defined by:

evaporation of a portion of the working fluid from the battery surface wick upon receiving heat from the at least one battery;

condensation of a portion of the evaporated portion of the working fluid on the interior wick structure; and fluid transportation by a capillary force of the condensed evaporated portion of the working fluid from the interior wick structure to the battery surface wick via the interior base wick.

22. The system of claim 3, further comprising an operational flow of the working fluid, wherein the operation flow is defined by:

evaporation of a portion of the working fluid from the interior wick structure upon receiving heat from the heater; and condensation of a portion of the evaporated portion of the working fluid on the battery surface wick.

* * * * *